Sept. 26, 1933.       A. G. ANDERSON       1,928,584
SNAP FASTENER AND INSTALLATION THEREOF
Filed June 11, 1931
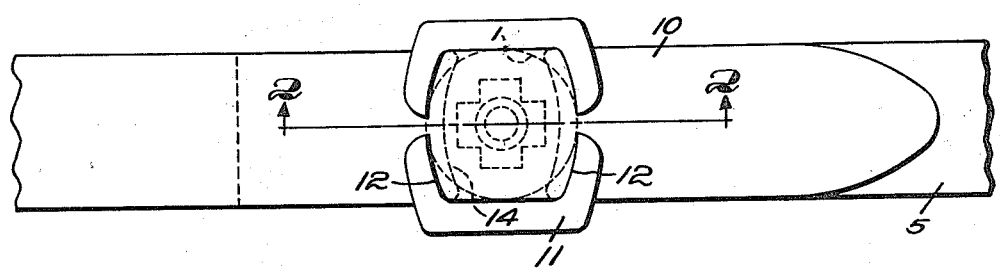
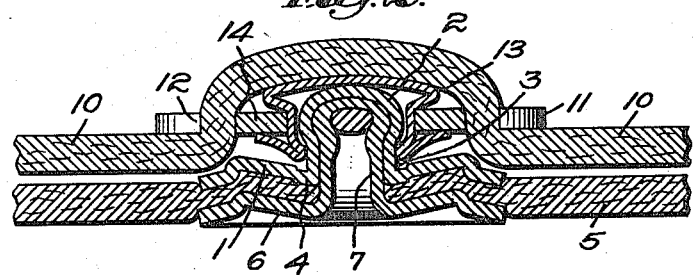
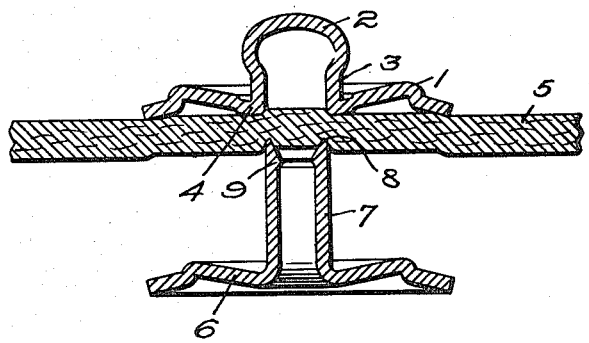
Inventor:
Andrew G. Anderson
by Emery, Booth, Varney & Townsend
Attys Patented Sept. 26, 1933

1,928,584

UNITED STATES PATENT OFFICE 1,928,584

SNAP FASTENER AND INSTALLATION THEREOF

Andrew G. Anderson, Wollaston, Mass., assignor to United-Carr Fastener Corporation, Cambridge, Mass., a corporation of Massachusetts Application June 11, 1931. Serial No. 543,542

5 Claims. (Cl. 24—219)

My invention aims to provide improvements in snap fasteners for use particularly on articles of rubber or articles having a rubber content.

In the drawing which illustrates a preferred embodiment of my invention:—

Figure 1 is a plan view of a slide fastener installation for use with straps of bathing hats, rubber shoes and the like;

Fig. 2 is an enlarged section taken on the line 2—2 of Figure 1; and

Fig. 3 is a section of the stud installation showing the relation of the parts just prior to assembly.

Referring to the drawing I have shown snap fastener members particularly, though not exclusively, useful in connection with bathing hats, or other rubber devices needing a so-called slide fastener.

While I have shown a particular snap fastener device for a particular use, it should be understood that other types of fasteners may be used and their construction will depend largely upon the construction of the rubber articles to which they are to be attached.

My snap fastener members are made of aluminum or any other metal having a non-copper content because I have found that ordinary snap fasteners made from copper or brass are not suitable for use on rubber articles. These copper content fasteners react upon the rubber carrying-medium in such a manner that the rubber is spoiled adjacent to where the fastener members are attached, thereby rendering the articles unfit for sale and in many cases unfit for use.

While I have found that fasteners made from aluminum overcome the difficulties of fasteners formed from copper content metals, I have also been required to incorporate certain features of construction because of the fact that aluminum is relatively soft.

As an example of my invention I have shown a stud installation which includes a snap fastener stud member formed from sheet aluminum and having a base 1 from which is pressed a boss formed to provide a head 2 and a neck 3.

Adjacent to the point where the boss of the stud is connected to the base, I have provided an annular rib 4 in the base (Figs. 2 and 3) to provide strength to the stud member at that point. The carrying medium for the stud in this particular instance is the rubber strap 5 of a bathing cap (not shown), or it may be a portion of the bathing cap itself depending upon the construction. As a means of attaching the stud to the rubber-carrying medium 5, I have provided a rivet (Fig. 3) having a base 6 from which is pressed a tubular shank 7 having its free end open, as illustrated. Adjacent to the free end of the tubular portion of the rivet I have suitably formed the material to provide a relatively sharp cutting edge 8 and a reinforcing means in the form of a shoulder 9 spaced a slight distance from the end (Fig. 3), thereby to back-support the cutting edge of the tubular portion 7 so that it may be forced through the rubber-carrying medium 5, thereby cutting a hole therethrough. As the tubular portion 7 of the rivet passes into the boss portion of the stud during attachment of the parts of the stud installation, the free end of the rivet contacts with the curved inner surface of the head 2 of the stud and is upset in substantially the same manner as shown in Fig. 2, thereby securely attaching the stud to the carrying medium 5. The tubular rivet is also made from sheet aluminum, or other suitable non-copper content material. In the particular rivet structure illustrated in the drawing, the shoulder 9 adjacent to the end of the tubular portion 7 strengthens the aluminum and the rib 4 on the base of the stud strengthens the aluminum of the stud member so that during the cutting operation the parts of the stud installation may withstand the pressure exerted upon them, thereby permitting them to retain their proper shape during this operation.

The socket member which I have selected for use in connection with the stud member above described is also made from sheet aluminum or other suitable non-copper content material and is of the so-called slidable type adapted to be attached to a strap 10 (Figs. 1 and 2) and adapted to be slidable relative thereto. The particular socket illustrated includes a plate portion 11 having strap-receiving slots 12—12 and a yieldable stud-engaging part 13 attached to a portion 14 located between the strap-receiving slots 12—12.

My improved fastener members are particularly useful to rubber goods manufacturers and having been developed after considerable experimental work to overcome the objections to the use of soft metals such, for instance, as aluminum in order to correct the difficulties which arise in connection with the use of the ordinary type of fastener made from metal having a copper content.

While I have illustrated and described a preferred embodiment of my invention, I do not wish to be limited thereby, because the scope of my invention is best defined by the following claims.

I claim:

1. A snap fastener installation comprising, in combination, a rubber content carrying medium, a snap fastener stud part located at one side of said carrying medium, said stud having a base and a hollow socket-engaging boss extending from said base and an attaching rivet formed from soft non-copper content metal and having a base and a tubular portion extending from said base through the carrying medium and upset within the boss of the stud part to secure the parts of the installation together, said tubular portion of said rivet before attachment having a thickened portion providing reinforcing means formed at its free end to prevent collapsing of the end upon being forced through the carrying medium.

2. A snap fastener installation comprising, in combination, a rubber content carrying medium, a snap fastener stud part located at one side of said carrying medium, said stud having a base and a hollow socket-engaging boss extending from said base and an attaching rivet formed from soft non-copper content metal and having a base and a tubular portion extending from said base through the carrying medium and upset within the boss of the stud part to secure the parts of the installation together, said tubular portion of said rivet before attachment having a thickened portion providing an inwardly extending annular shoulder at the inner surface thereof adjacent to the free edge to thicken said rivet and said tubular portion tapering from said shoulder to the free end to provide a cutting edge for self-piercing of the carrying medium.

3. A snap fastener installation comprising, in combination, a rubber content carrying medium, a snap fastener stud part located at one side of said carrying medium, said stud being formed from a soft non-copper content metal and having a base and a hollow socket-engaging boss extending from said base and reinforcing means formed in said stud adjacent to the point where the boss joins the base and an attaching rivet formed from soft non-copper content metal and having a base and a tubular portion extending from said base through the carrying medium and upset within the boss of the stud part to secure the parts of the installation together, said tubular portion of said rivet before attachment having a reinforcing means formed at its free end to prevent collapsing of the end upon being forced through the carrying medium.

4. A snap fastener installation comprising, in combination, a supporting structure of rubber, a snap fastener member attached to one side of said supporting structure and being formed from aluminum, said snap fastener member having a base 1, a hollow boss extending from said base and providing a socket-engaging head 2 and a neck 3 and an annular rib 4 provided in said base adjacent to the point where the boss connects with the base and an aluminum rivet having a base 6 cooperating with the base 1 of the stud to grip the rubber supporting structure therebetween, and said rivet having a hollow tubular portion 7 forced through the supporting structure and upset within the head of the stud to secure the parts of the installation together.

5. A snap fastener installation comprising, in combination, a rubber content carrying medium, a snap fastener stud part located at one side of said carrying medium, said stud being formed from a soft non-copper content metal and having a base and a hollow socket-engaging boss extending from said base and reinforcing means formed in said stud adjacent to the point where the boss joins the base and an attaching member formed from soft non-copper content metal and having a base and a hollow shank portion extending from said base through the carrying medium and upset within the boss of the stud part to secure the parts of the installation together, and said reinforcing means of the stud preventing distortion of the stud when the shank of the attaching member is forced into attaching position.

ANDREW G. ANDERSON.